(12) United States Patent
Sarwono et al.

(10) Patent No.: US 7,743,137 B2
(45) Date of Patent: Jun. 22, 2010

(54) AUTOMATICALLY TARGETING NOTIFICATIONS ABOUT EVENTS ON A NETWORK TO APPROPRIATE PERSONS

(75) Inventors: Edhi Sarwono, Redmond, WA (US); Frank Zakrajsek, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1355 days.

(21) Appl. No.: 11/052,147

(22) Filed: Feb. 7, 2005

(65) Prior Publication Data
US 2006/0177058 A1    Aug. 10, 2006

(51) Int. Cl.
G06F 15/173 (2006.01)
G06F 15/16 (2006.01)
G06F 11/00 (2006.01)

(52) U.S. Cl. .................. 709/224; 709/206; 714/26; 714/39; 714/43

(58) Field of Classification Search .................. None
See application file for complete search history.

(56) References Cited

U.S. PATENT DOCUMENTS

| | | | |
|---|---|---|---|
| 7,069,309 B1 * | 6/2006 | Dodrill et al. | 709/219 |
| 7,293,271 B2 * | 11/2007 | Trossen et al. | 719/318 |
| 7,406,516 B2 * | 7/2008 | Davis et al. | 709/224 |
| 2004/0158629 A1 * | 8/2004 | Herbeck et al. | 709/224 |
| 2005/0010545 A1 * | 1/2005 | Joseph | 707/1 |
| 2005/0223287 A1 * | 10/2005 | Childress et al. | 714/26 |
| 2006/0004911 A1 * | 1/2006 | Becker et al. | 709/207 |

OTHER PUBLICATIONS

Ives, Zachary, Abstracts of invited industrial track presentations, 2003, ACM, pp. 635-636.*

* cited by examiner

*Primary Examiner*—Hussein Elchanti
*Assistant Examiner*—Ho Shiu
(74) *Attorney, Agent, or Firm*—Wolf, Greenfield & Sacks, P.C.

(57) ABSTRACT

Automatically notifying, in response to an event associated with a particular server and/or application on a network, only appropriate person(s) such as, for example, only the IT member(s) responsible for supporting the server and/or application. The work schedules and the work schedule exceptions of one or more persons may be taken into account when determining whom to notify of an event on a network. Event information may be received. In response, subscription information for a plurality of subscribers may be accessed, which may include any of: one or more applications for which the subscriber is responsible; one or more servers for which the subscriber is responsible; a work schedule of the subscriber for receiving notifications, and one or more exceptions to this schedule. At least one subscriber may be selected by comparing this information to the event information, and a notification may be sent to the at least one subscriber.

6 Claims, 13 Drawing Sheets

|       | Field Name           | Field Type     |
|-------|----------------------|----------------|
|       | SubscriberDeviceName | nvarchar(255)  |
|       | SubscriberLocale     | nvarchar(10)   |
| 406   | ComputerName         | nvarchar(255)  |
| 408   | Description          | nvarchar(4000) |
| 410   | Severity             | Tinyint        |
| 412   | Source               | nvarchar(255)  |
| 414   | ManagementPackName   | nvarchar(510)  |
| 416   | ComputerGroupName    | nvarchar(510)  |
|       | SubscriberDeviceAddress | nvarchar(255) |
|       | SubscriptionID       | BigInt         |
|       | SubscriberID         | nvarchar(255)  |
|       | Created              | Datetime       |
|       | Updated              | Datetime       |
|       | Enabled              | Bit            |

*FIG. 4*

| Field Name   | Field Type    |
|--------------|---------------|
| SubscriberID | nvarchar(255) |
| ScheduleID   | Int           |
| DayOfWeek    | Int           |
| StartTime    | nvarchar(8)   |
| EndTime      | nvarchar(8)   |
| AllDay       | Bit           |
| AllTime      | Bit           |

*FIG. 5*

| Field Name | Field Type |
|---|---|
| SubscriberID | nvarchar(255) |
| ScheduleOverrideID | Int |
| OverrideDate | Datetime |
| StartTime | nvarchar(8) |
| EndTime | nvarchar(8) |
| OverrideReason | nvarchar(255) |
| UpdatedBy | nvarchar(255) |
| AllDay | Bit |
| AllTime | Bit |

FIG. 6

| Field Name | Field Type |
|---|---|
| Guid | Uniqueidentifier |
| ComputerName | nvarchar(255) |
| Description | nvarchar(4000) |
| Name | nvarchar(255) |
| Owner | nvarchar(255) |
| RepeatCount | Int |
| Severity | Tinyint |
| Source | nvarchar(255) |
| TimeAdded | DateTime |
| TimeofFirstEvent | DateTime |
| TimeofLastEvent | DateTime |
| TimeRaised | DateTime |
| ManagementPackName | Nvarchar(510) |
| ComputerGroupName | Nvarchar(255) |
| ServerLocalTime | DateTime |
| EventBatchID | BigInt |
| EventID | BigInt |

FIG. 7

|  | Field Name | Field Type |
|---|---|---|
|  | Guid | Uniqueidentifier |
| 806 | ComputerName | nvarchar(255) |
| 808 | Description | nvarchar(4000) |
|  | Name | nvarchar(255) |
|  | Owner | nvarchar(255) |
|  | RepeatCount | Int |
| 810 | Severity | Tinyint |
| 812 | Source | nvarchar(255) |
|  | TimeAdded | DateTime |
|  | TimeofFirstEvent | DateTime |
|  | TimeofLastEvent | DateTime |
|  | TimeRaised | DateTime |
| 814 | ManagementPackName | nvarchar(510) |
| 816 | ComputerGroupName | nvarchar(510) |
|  | SubscriberDeviceAddress | nvarchar(255) |
|  | LimitedText | bit |
|  | ServerLocalTime | DateTime |
|  | SeverityLevelText | nvarchar(20) |
|  | NotificationID | BigInt |
|  | NotificationBatchID | BigInt |
|  | SubscriberID | nvarchar(255) |
|  | DeviceName | nvarchar(255) |
|  | SubscriberLocale | nvarchar(10) |
|  | DeliveryStatusCode | TinyInt |
|  | SentTime | DateTime |
|  | LinkNotificationID | BigInt |

FIG. 8

| Field Name | Field Type |
|---|---|
| TimeAdded | DateTime |
| PreviousEventBatchId | bigint |

*FIG. 9* — 900

| Field Name | Field Type |
|---|---|
| ManagementPackID | Uniqueidentifier |
| ManagementPackName | nvarchar(510) |

*FIG. 10* — 1000

| Field Name | Field Type |
|---|---|
| Offset | nvarchar(10) |

AUTOMATICALLY TARGETING NOTIFICATIONS ABOUT EVENTS ON A NETWORK TO APPROPRIATE PERSONS

BACKGROUND

Efficiently utilizing Information Technology (IT) resources (e.g., personnel) of a business enterprise is becoming increasingly difficult, as the organizational structure of enterprises and supporting network infrastructures become more complex. As used herein, a "network" is a group of two or more network elements interconnected by one or more segments of transmission media on which communications may be exchanged between the elements. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two network elements connected by a single wire, bus, wireless connection or other type of segments. Further, it should be appreciated that when a network is illustrated in a drawing herein as being connected to an element in the drawing, the connected element itself is considered part of the network.

Business enterprises often have several business units such as, for example, finance, accounting, sales, human resources, research and development (R&D), customer support, etc., and each business unit may have its own server(s) on the enterprise's network. Each business unit also may have one or more proprietary applications (e.g., that run on it's own servers), including monitoring applications residing at different layers of the server architecture such as, for example, hardware, firmware, and software applications. Further, one or more of the business units may employ their own IT group (e.g., operations staff), where each group member has technical expertise with respect to the servers and/or applications of the business unit.

When problems arise with a business unit's application or server such as, for example, software errors and/or hardware errors or failures, the appropriate IT member needs to be notified so the problem can be addressed. Some enterprises still rely, at least in part, on manual notification of problems, where a user contacts one or more IT group members by telephone, e-mail, pager or otherwise. Obvious drawbacks to manual notification are the unreliability of users to learn of a problem and/or report it to the IT group, and the inherent delays and consumption of user resources in relying on users to do so.

For these reasons, many enterprises have turned to automated notification systems that automatically detect problems as "events" and notify IT members of these events. However, known automated notification systems typically do not account for the complexities of today's business enterprises and the networks that support them. For example, when a problem with a server or an application running on a server is discovered, known systems do not consider the business unit(s) responsible for the application or server when generating notifications. As a result, notifications are generated and sent to IT personnel irrespective of whether the IT personnel are responsible for supporting (or have expertise with respect to) the server or application. For example, in response to a sales group's SQL server crashing, a notification system may send notifications of the failure to IT personnel (e.g., members of the R&D, accounting and human resources IT groups) other than those employed by and/or responsible for the sales department (e.g., the sales department's IT group). These other IT personnel may disregard the notification (e.g., treat it as a sort of "spam") or perhaps coordinate with the appropriate IT group members to respond to the notification. In either case, IT personnel time is wasted, such that the Enterprise's IT resources are inefficiently utilized.

SUMMARY

Thus, there is a need for an automated notification system that makes more efficient use of an Enterprise's IT resources. That is, a system is needed that, in response to certain events (e.g., associated with a particular server and/or application) on the Enterprise's network, does not unnecessarily notify the wrong persons such as, for example, IT personnel not responsible for supporting the server and/or application.

Described herein are systems and methods for automatically notifying, in response to an event on the Enterprise's network (e.g., a problem associated with a particular server and/or application), only the appropriate person(s) such as, for example, only the IT member(s) responsible for supporting the server and/or application. That is, an automated notification system and method that notifies the right person(s) in response to an event is described herein.

In some embodiments, the work schedules and the work schedule exceptions of one or more persons may be taken into account when determining whom to notify of an event on a network. Considering persons' schedules and exceptions to these schedules may further improve the targeting of notifications, which may in turn increase the efficiency of Enterprise resource (e.g., technical resource) utilization.

In an embodiment of the invention, at least one person is notified of an occurrence of an event associated with a first application and/or a first server. Event information specifying the event is received, the event information including an indication of the first application and/or and indication of the first server. Subscription information is accessed from one or more data sources that store information about a plurality of subscribers subscribed to receive notification of certain events. For each subscriber, the subscription information specifies one or more applications and/or servers for which the subscriber is responsible. At least one of the plurality of subscribers is selected, including, for each of the plurality of subscribers, determining whether one of the applications and/or servers specified by the subscription information for the subscriber is the first application and/or first server, respectively. A notification of the event is sent to the at least one subscriber.

In an aspect of this embodiment, the at least one subscriber is a person responsible for providing technical support for the application and/or the server.

In another aspect of this embodiment, schedule information for one or more of the plurality of the subscribers is accessed. The schedule information includes, for each of the one or more subscribers, a work schedule of the subscriber and one or more work schedule exceptions for the subscriber. Selecting the at least one subscriber includes basing the selection at least in part on the work schedule and the one or more work schedule exceptions of one or more subscribers.

In yet another aspect of this embodiment, selecting the at least one subscriber includes, for each of the one or more subscribers, comparing the work schedule and the one or more work exceptions of the subscriber to a current time corresponding to a time at which the at least one subscriber is selected.

In another aspect of this embodiment, the event information includes one or more of the following pieces of event information: a server group to which the server belongs; a severity of the notification; a description of the notification; and a source of the event. The subscription information includes, for each subscriber of the plurality of subscribers, one or more of the following pieces of subscription information: one or more server groups for which the subscriber is responsible; a threshold level of severity of an event for which to notify the subscriber; one or more event descriptions for which to notify the subscriber; and one or more event sources for which to notify the subscriber. Selecting the at least one subscriber includes selecting the at least one subscriber from the plurality of subscriber based at least in part on comparing, for each of the plurality of subscribers, at least one of the one or more pieces of subscription information to a corresponding one of the pieces of event information.

In yet another aspect of this embodiment, a user interface is provided enabling a user to enter subscription information for one or more subscribers into the one or more data sources.

In another aspect of this embodiment, the subscription information is received from one or more users.

In another aspect of this embodiment, the embodiment of the invention described in the preceding paragraphs and/or one or more aspects thereof is implemented using SQL Notification Services available from Microsoft Corporation.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs.

In another embodiment of the invention, a system is provided for notifying at least one person of an occurrence of an event associated with a first application and/or a first server. The system includes a subscriber selection module to select at least one subscriber from a plurality of subscribers subscribed to receive notifications of certain events. The subscriber selection module is operative to receive event information specifying the event, the event information including an indication of the first application and/or and indication of the first server. The subscriber selection module is operative to access subscription information from one or more data sources that store information about the plurality of subscribers. For each subscriber, the subscription information specifies one or more applications and/or servers for which the subscriber is responsible. The subscriber selection module is further operative to determine, for each of the plurality of subscribers, whether one of the applications and/or servers specified by the subscription information for the subscriber is the first application and/or the first server, respectively. The system further includes a notification distribution module to send a notification of the event to the at least one subscriber.

In an aspect of this embodiment, the subscriber selection module includes means for selecting the at least one subscriber.

In another aspect of this embodiment, the at least one subscriber is a person responsible for providing technical support for the application and/or the server.

In another aspect of this embodiment, the subscriber selection module is operative to access schedule information for one or more of the plurality of the subscribers. The schedule information includes, for each of the one or more subscribers, a work schedule of the subscriber and one or more work schedule exceptions for the subscriber. The subscriber selection module is operative to base the selection at least in part on the work schedule and the one or more work schedule exceptions of one or more subscribers.

In yet another aspect of this embodiment, the subscriber selection module is operative to compare, for each of the one or more subscribers, the work schedule and the one or more work exceptions of the subscriber to a current time corresponding to a time at which the selection is made.

In another aspect of this embodiment, the event information includes one or more of the following pieces of event information: a server group to which the server belongs; a severity of the notification; a description of the notification; and a source of the event. The subscription information includes, for each subscriber of the plurality of subscribers, one or more of the following pieces of subscription information: one or more server groups for which the subscriber is responsible; a threshold level of severity of an event for which to notify the subscriber; one or more event descriptions for which to notify the subscriber; and one or more event sources for which to notify the subscriber. The subscriber selection module is operative to select the at least one subscriber from the plurality of subscriber based at least in part on comparing, for each of the plurality of subscribers, at least one of the one or more pieces of subscription information to a corresponding one of the pieces of event information.

In another aspect of this embodiment, the system further includes a subscription management module that provides a user interface enabling a user to enter subscription information for one or more subscribers into the one or more data sources.

In yet another aspect of this embodiment, the system further includes a subscription management module to receive the subscription information from one or more users.

In another aspect of this embodiment, the subscriber selection module and/or the notification module include at least part of a SQL Notification Services architecture available from Microsoft Corporation.

In another embodiment of the invention, at least one person is notified of an occurrence of an event associated with a communications network. Event information specifying the event is received. Schedule information is accessed from one or more data sources that store information about a plurality of subscribers subscribed to receive notification of certain events. For each of one or more of the plurality of subscribers, the schedule information specifies a work schedule of the subscriber and one or more work schedule exceptions for the subscriber. At least one of the one or more subscribers is selected based at least in part on the work schedule and the one or more work schedule exceptions of the one or more subscribers. A notification of the event is sent to the at least one subscriber.

In an aspect of this embodiment, selecting the at least one subscriber includes, for each of the one or more subscribers, comparing the work schedule and the one or more work exceptions of the subscriber to a current time corresponding to a time at which the comparison is made.

In another aspect of this embodiment, the at least one subscriber is a person responsible for providing technical support for the application and/or the server.

In another aspect of this embodiment, a user interface is provided enabling a user to enter schedule information for one or more subscribers into the one or more data sources.

In yet another aspect of this embodiment, the schedule information is received from one or more users.

In another aspect of this embodiment, the embodiment of the invention described in the preceding paragraphs and/or one or more aspects thereof is implemented using SQL Notification Services available from Microsoft Corporation.

In yet another embodiment of the invention, a system is provided for notifying at least one person of an occurrence of an event associated with a first application and/or a first server. The system includes a subscriber selection module to select at least one subscriber from a plurality of subscribers subscribed to receive notification of certain events. The subscriber selection module is further operative to receive event information specifying the event, the event information including a time indication corresponding to a time at which the event occurred. The subscriber selection module is further operative to access subscription information from one or more data sources that store information about the plurality of subscribers. For or each of one or more of the plurality of subscribers, the subscription information specifies a work schedule of the subscriber and one or more work schedule exceptions for the subscriber. The subscriber selection module is operative to select at least one of the one or more subscribers based at least in part on the work schedule and the one or more work schedule exceptions of the one or more subscribers. The system further includes a notification distribution module to send a notification of the event to the at least one subscriber.

In an aspect of this embodiment, the subscriber selection module is operative to compare, for each of the one or more subscribers, the work schedule and the one or more work exceptions of the subscriber to a current time corresponding to a time at which the comparison is made.

In another aspect of this embodiment, the at least one subscriber is a person responsible for providing technical support for the application and/or the server.

In another aspect of this embodiment, the system further includes a subscription management module to provider a user interface enabling a user to enter schedule information for one or more subscribers into the one or more data sources.

In another aspect of this embodiment, a subscription management module to receive the schedule information from one or more users.

In another aspect of this embodiment, the subscriber selection module and/or the notification distribution module include at least part of a SQL Notification Services architecture available from Microsoft Corporation.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIG. 4 illustrates an example of a subscription schema in accordance with some embodiments of the invention;

FIG. 5 is a diagram illustrating an example of a subscriber work schedule schema in accordance with some embodiments of the invention;

FIG. 6 is a diagram illustrating an example of a subscriber work schedule exception schema according to some embodiments of the invention;

FIG. 7 is a diagram illustrating an example of an event schema in accordance with some embodiments of the invention;

FIG. 8 is a diagram illustrating an example of a notification schema according to some embodiments of the invention;

FIG. 9 is a diagram illustrating an example of an event chronicle schema in accordance with some embodiments of the invention;

FIG. 10 is a diagram illustrating an example of a management pack schema in accordance with some embodiments of the invention;

FIG. 11 is a diagram illustrating an example of a time zone schema according to some embodiments of the invention;

FIG. 13 is a screen shot illustrating an example of a user interface display for adding and/or changing subscription information for a user;

DETAILED DESCRIPTION

Figure 1:
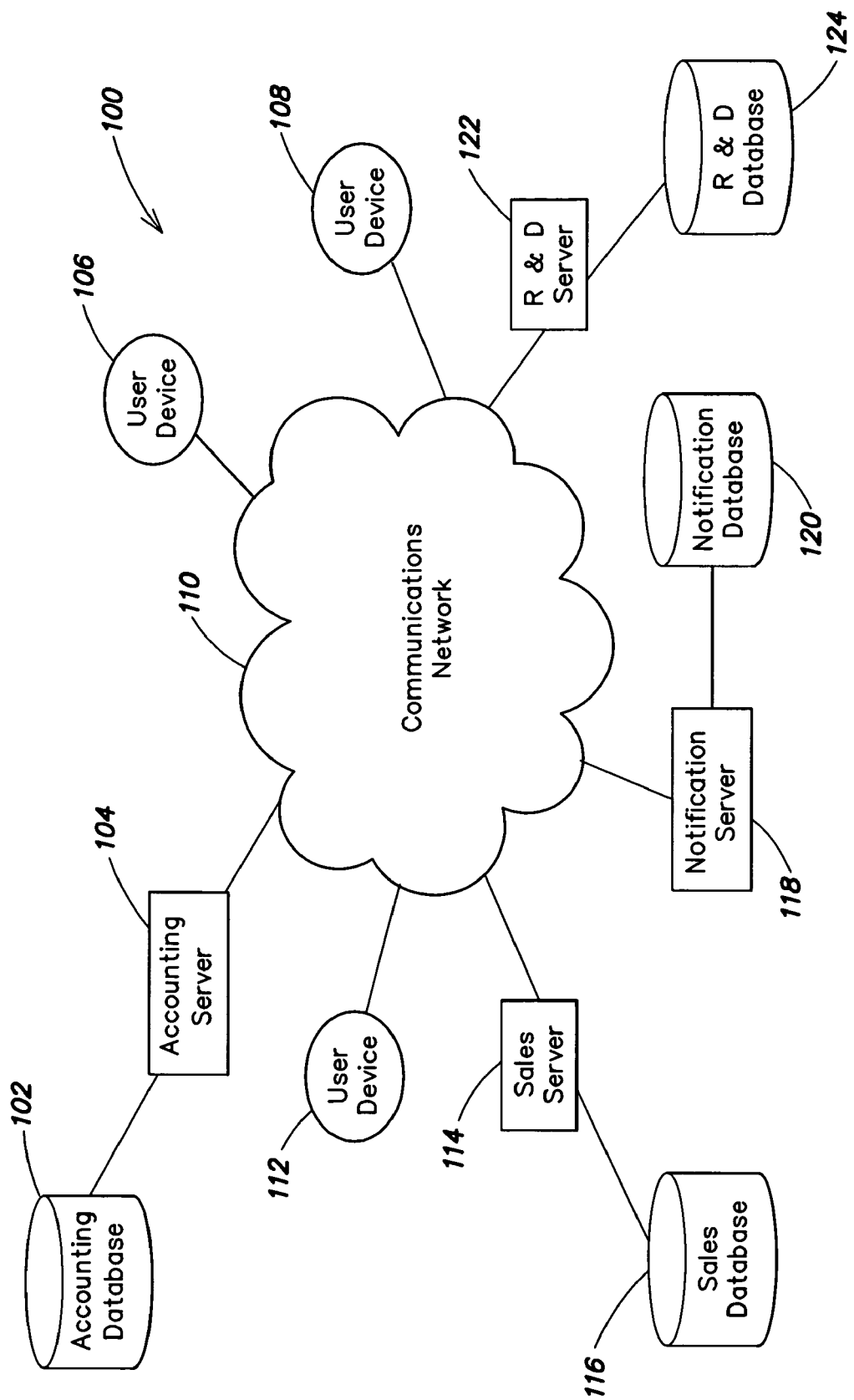
FIG. 1 is a block diagram illustrating an example of a network system on which some embodiments of the invention may be implemented.

Although some embodiments of the invention are described in relation to targeting a notification of an event to one or more technical support providers (e.g., IT personnel), the invention is not so limited. Automatically targeting notification of an event to any person, regardless of the person's occupation or responsibilities, is intended to fall within the scope of the invention. As used herein, a "technical support provider" is a person who provides technical support for any of certain software, hardware and firmware or a combination thereof such as, for example, one or more computer systems (e.g., a server) and/or one or more applications. Technical support providers may include, but are not limited to, IT team members, who typically provide support internally for an enterprise, persons who provide external support on behalf of an enterprise to customers of an enterprise, and technical support persons who provide technical support to customers of an enterprise, but are not employees or agents of the enterprise.

As used herein, a "server" is a computer system or a portion thereof, residing on a network, that provides one or more services for users. Such services may be embodied as one or more applications, at least a portion of each application residing on the server. For example, a server portion of the application may reside on the server while the client portion of an application may reside on one or more user devices. As used herein, a "user device" is a communication and/or computational device from/to which a user may send/receive communications, and which may serve as an endpoint to communications on a communications network. User devices include, but are not limited to: workstations; personal computers (e.g., PCs); laptop computers, notebook computers; telephones (e.g., landline or mobile); pagers; Blackberry™ brand devices, PCS devices, personal digital assistants (PDAs), two-way radios (e.g., "walkie-talkies"), other types of user devices, and any suitable combination of the foregoing.

Although some embodiments of the invention are described as being implemented using the SQL Notification Services (NS) architecture available from Microsoft Corporation, the invention is not so limited. Other suitable architectures, including known architectures, may be used and are intended to fall within the scope of the invention.

The function and advantage of these and other embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

FIG. 1 is a block diagram illustrating an example of a network system 100 on which some embodiments of the invention may be implemented. System 100 is merely an illustrative embodiment of a network system on which embodiments of the invention may be implemented, and is not intended to limit the scope of the invention. Any of numerous other implementations of such a system, for example, variations of system 100, are possible and are intended to fall within the scope of the invention.

Network system 100 may represent an enterprise's network or a portion thereof and may include any of: communications network 110; one or more user devices (e.g., any of user devices 106, 108 and 112); one or more servers (e.g., any of accounting server 104, sales server 114, notification server 118 and R&D server 122); one or more data sources (e.g., accounting database 102, sales database 116, notification database 120 and R&D database 124) and one or more other network devices. Although FIG. 1 illustrates only three user devices, it should be appreciated that network system 100 may include any number of user services such as, for example, tens, hundreds or even thousands of user devices. Further, system 100 may include several other servers and/or data sources. It should also be appreciated that one or more servers may reside on a same network device as a user device. For example, notification server 118 and user device 112 may reside on a same network device, such that communications between the two do not need to travel across any network media of network 110. Further, one or more data sources may reside on a same network device as one or more servers and/or one or more user devices.

Each of servers 104, 114, 118 and 122 may provide access to and services relating to the data residing in its respective database 102, 116, 120 and 124. Although FIG. 1 illustrates one-to-one relationships between servers and databases, a single server may provide access and/or provide services relating to the data residing in multiple data sources. Further, multiple servers may provide access to and/or services relating to the data residing in a single data source.

Accounting server 104 may provide services for and/or be owned by an accounting group of an enterprise, and sales server 114 and R&D server 122 may provide services for and/or be owned by a sale group and an R&D group, respectively.

Notification server 118 may be configured to send notifications to user devices (e.g., user devices 106, 108 and 112) in response to events that occur on the network, for example, events relating to any of servers 104, 114 and 122. Events relating to or associated with a server include, but are not limited to: software errors and/or hardware errors or failures on the server (including those relating to applications residing on the server), any of its corresponding data sources, or any connections between the server and other network components (e.g., its corresponding data source(s), peripheral devices, other servers, user devices, printers, etc.); and a change or addition to any information (e.g., change of a state of a variable) on the server or any of its corresponding data sources.

According to some embodiments of the invention, the notification server 118 may be configured to target notifications of events to one or more persons (e.g., users or others). The notification server may be configured by one or programmers and/or one or more users, as will be described below in more detail, and may include storing certain data in one or more notification databases.

Figure 2:
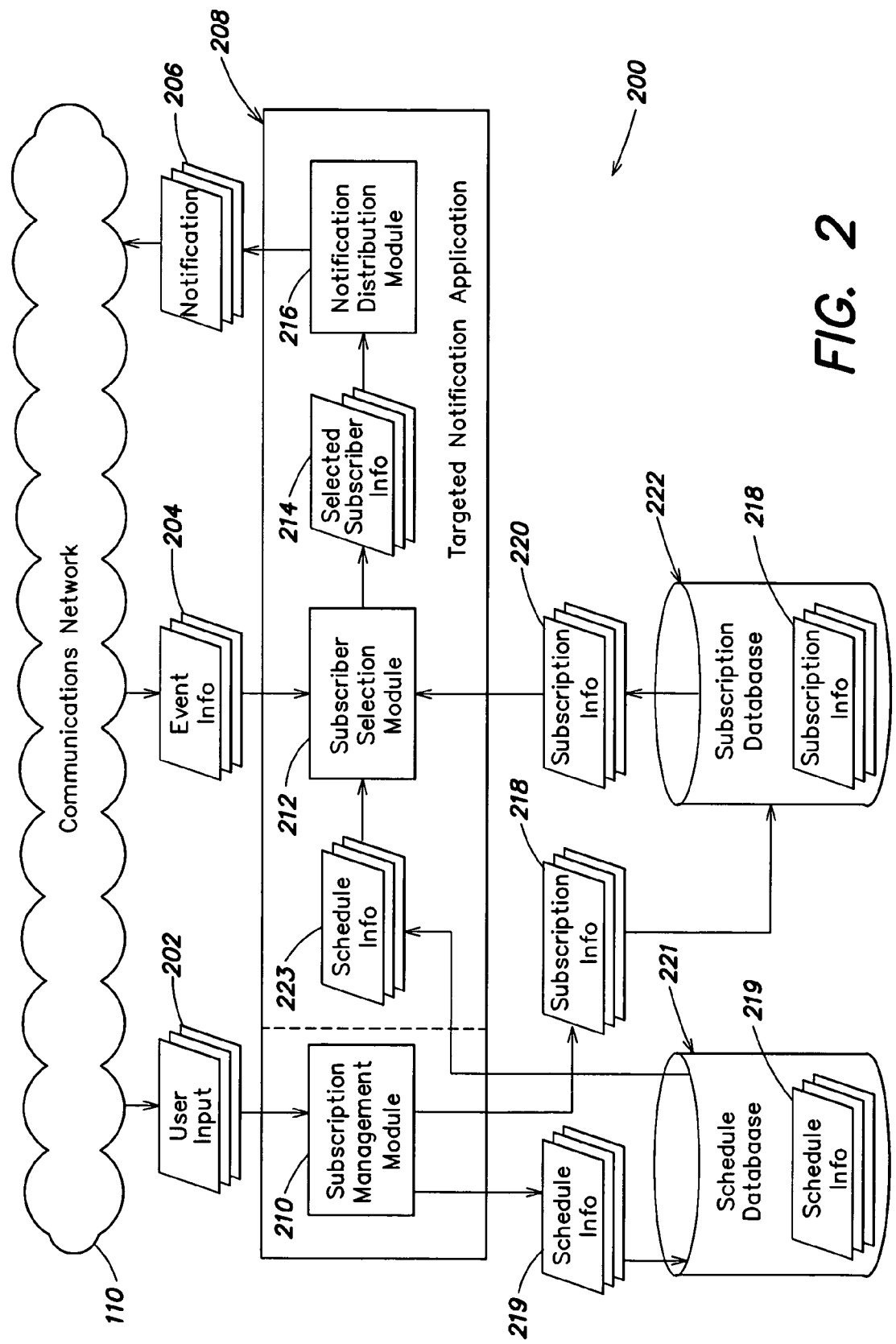
FIG. 2 is a block diagram illustrating an example of a system for notifying at least one person of an occurrence of an event associated with a network device, in accordance with some embodiments of the invention.

FIG. 2 is a block diagram illustrating an example of a system 200 for automatically notifying at least one person of an occurrence of an event associated with a network device, in accordance with some embodiments of the invention. System 200 is merely an illustrative embodiment of a system for automatically notifying at least one person of an occurrence of an event, and is not intended to limit the scope of the invention. Any of numerous other implementations of such a system, for example, system 1200 (described below in relation to FIG. 12) and variations of system 200 or system 1200, are possible and are intended to fall within the scope of the invention.

System 200 may include any of communications network 110, targeted notification application (TNA) 208, schedule database 22 and subscription database 222. TNA 208 may reside on a notification server (e.g., server 118 of FIG. 2) and each of schedule database 221 and subscription database 222 may be part of a same database (e.g., notification database 120). Each of the databases shown in FIGS. 1, 2, 3, 12A and 12B may be any of a plurality of type of database such as, for example, a relational database, an object-oriented database, a file system, another type of database, or any suitable combination of the foregoing. TNA 208 may be configured to store schedule information 219 and subscription information 218 based on one or more user inputs 202, to select one or more subscribers 214 based on subscription information 220, schedule information 223 and event information 204, and/or generate and send one or more notifications 206 to the selected one or more subscribers 214. TNA 208 may include any of subscription management module (SMM) 210, subscriber selection module (SSM) 212 and notification distribution module (NDM) 216.

TNA 208 may be implemented using any of a variety of architectures such as, for example, the SQL 2000 NS architecture available from Microsoft Corporation. Information regarding the SQL 2000 NS architecture is available at the website having the URL: www.microsoft.com/sql/NS/default.asp, the contents of which a hereby incorporated by reference. Other known architectures may be used. Further, TNA 208 may be implemented without using any known architecture. That is, it may be created "from scratch."

SMM 210 may be configured to enable one or more users to provide user input 202 for one or more subscribers, and to generate subscription information 218 and schedule information 219 from the user input. Although SMM 210 is illustrated as being part of TNA 208, it may be a separate application from SMM 210 or a portion of such an application. For example, module 210 may be a web-based application configured to interface with the browser of one or more user devices to enable a user to enter information, and/or may be a server portion of an application having a client portion residing on one or more user devices.

As used herein, a "subscriber" is a person subscribed (i.e., registered or signed-up) to be eligible to receive notifications of events associated with a network (e.g., network 110). Subscribing a user to be eligible to receive notification may include entering information for the user in a database (e.g., notification database 120). Such information is referred to herein as "subscriber information." A subscriber may be subscribed to receive notifications for one or more particular notification applications (e.g., TNA 208). As used herein, "subscription information" is information defining a subscriber's subscription to one or more particular notification applications (e.g., TNA 208), subscribing the user to receive a notification for one or more particular events associated with a network, for example, events associated with one or more servers and/or applications. A subscriber for a particular application can be, but is not necessarily, a user of the application. For example, a subscriber may be a technical support provider who supports the application, but does not actually use the application (aside from addressing technical issues).

The user input 202 and subscription information 218 may include, for each subscriber, any of the following information: one or more applications for which the subscriber is responsible; one or more servers (e.g., computers) for which the subscriber is responsible; one or more server groups (e.g., computer groups) for which the user is responsible; a severity threshold of an event for which to notify the subscriber; one or more event descriptions for which to notify the subscriber; and one or more event sources for which to notify the subscriber.

The one or more applications included in the subscription information may be specified in any of a variety of ways. For example, an identifier (e.g., a name) and/or location of an application may be specified. Further, if system 200 is a system capable of using management packs (e.g., a system that is implemented using an SQL NS architecture), an application may be specified by specifying a management pack corresponding to the application. As used herein, a "management pack" is a set of one or more rule groups, where a rule group is a set of one or more rules. Each event, which may result in a notification being sent to one or more subscribers, may be triggered by a rule. Thus, a management pack can be configured to include a particular set of rule groups, which in turn include a particular set of one or more rules that are specific to a particular application. Accordingly, by specifying a particular management pack in the subscription information for a subscriber, a particular application is specified.

In some embodiments, a management pack may be selected from a preexisting list of management packs, such as, for example, management packs available from a OnePoint database or one or more other Microsoft® Operations Management (MOM) databases available from Microsoft Corporation. For example, in some embodiments, a management pack may be selected and/or entered by a user through a user interface display such as, for example, user interface display 1300 described below in relation to FIG. 13. Such a user interface display may be provided by SMM 210.

The one or more servers and/or one or more server groups of the subscription information together may be classified as host information. The host information specifies the one or more servers (e.g., computers) to be monitored for the occurrence of events. A server group is a collection of one or more servers, which may be configured to communicate with TNA 208, for example, across communications network 110. For example, a computer group may define a group consisting of two or more of: accounting server 104; sales server 114; and R&D server 122. Further, the one or more servers specified in the subscription information may include any of these servers. Servers and server groups for which a subscriber can subscribe may be made available by a notification database such as, for example, a database available within a SQL NS architecture. One or more servers may be entered and/or selected by a user through a user interface display such as, for example, user interface display 1300. Such a user interface display may be provided by SMM 210.

Each of the one or more events sources for which to notify the subscriber may specify an entity responsible to generate an indication of the event. For given subscription information, the entity specified by the event source may be any entity residing on one of the servers or server groups specified by the subscription information or another network device on a communications network (e.g., network 110). Any of a variety of other types of entities also may be specified by each event source.

An event description provides a description of a specific event to be monitored, and a severity threshold specified a threshold level of severity of an event for which to notify a subscriber. The severity threshold may be specified using a number (e.g., 1-5), or a character string (e.g., "information", "warning" or "error"; or "low", "medium" or "high"), another type of symbol, or any suitable combination thereof, depending on the threshold system implemented for system 200.

Event sources, even descriptions and severity thresholds may be selected and/or entered by a user through a user interface display such as, for example, display 1300. Such a display may be provided by SMM 210. The available event sources, event descriptions and severity thresholds may be those made available through a notification database such as, for example, OnePoint or another MOM database available from Microsoft Corporation.

As an example, the subscription information of a subscriber may define that the subscriber is responsible to support a database management application (e.g., Microsoft® SQL Server) that manages a marketing database (e.g., part of sales database 116) for a sales group, and is responsible to support the server (e.g., sales server 114) that provides access to and services for the database application. Further, subscription information may define that the subscriber is to be notified of any events: described as a data integrity error; where the marketing database is the source of the event; and having a severity of at least "medium".

As used herein, "schedule information" is information defining a subscriber's work schedule for receiving notifications, and one or more exceptions to this schedule. Schedule information may be specific to a particular subscription or may apply to all subscriptions for a given subscriber. A subscriber's work schedule may specify a start time and an end time for which a subscriber intends to receives notifications for a selected day of the week. Further, for a given day of the week, the subscriber's work schedule may specify that the user intends to receive notifications all day (e.g., 24 hours). In addition, the subscriber's work schedule may specify that the user is free to receive notifications all the time (e.g., 24 hours a day, 7 days a week), regardless of the date, day or time.

A work schedule exception may specify exceptional conditions to the subscriber's work schedule, for which the subscriber is not to receive notifications. Thus, a work schedule exception overrides a work schedule specified for a subscriber. A work schedule exception may specify a date, start time and end time for the exception, and may specify a reason for the exception. For example, the schedule information for a subscriber may specify that the subscriber has a work schedule of Monday through Friday, 9:00 a.m. to 5:00 p.m., and specify a work schedule exception indicating that the subscriber does not work the Friday after Thanksgiving. Schedule information may be entered and/or selected by a user through any of a variety of types of user interface displays (e.g., a GUI display), which may be provided by SMM 210.

SMM 210 may be configured to provide a user interface that enables users to enter subscription information 218 and/or schedule information 219, which may provide one or more user interface displays (e.g., display 1300 described below in relation to FIG. 13). As used herein, a "user interface" is an application or part of an application (i.e., a set of computer-readable instructions) that enables a user to interface with an application during execution of the application. A user interface may include code defining how an application outputs information to a user during execution of the application, for example, visually through a computer screen or other means, audibly through a speaker of other means, and manually through a game controller or other means. Such user interface also may include code defining how a user may input information during execution of the application, for example, audibly using a microphone or manually using a keyboard, mouse, game controller, track ball, touch screen or other means.

The user interface may define how information is visually presented (i.e., displayed) to the user, and defines how the user can navigate the visual presentation (i.e., display) of information and input information in the context of the visual presentation. During execution of the application, the user interface may control the visual presentation of information and enable the user to navigate the visual presentation and enter information in the context of the visual presentation. Types of user interfaces range from command-driven interfaces, where users type commands, menu-driven interfaces, where users select information from menus, and combinations thereof, to GUIs, which typically take more advantage of a computer's graphics capabilities, are more flexible, intuitive and easy to navigate and have a more appealing "look-and-feel" than command-driven and menu-driven visual user interfaces. As used herein, the visual presentation of information presented by a user interface or GUI is referred to as a "user interface display" or a "GUI display", respectively.

In contrast to a typical notification system, in which only a select few users (e.g., a network administrator) have the ability to enter subscription information for subscribers, SMM 210 may be configured so that users may enter their own subscriber and schedule information and/or subscriber and schedule information for others. Such a configuration decentralizes the data entry workload on system 200. In some embodiments, SMM 210 may be configured (e.g. as a security feature or otherwise) to permit only select users to enter subscription information and/or schedule information for a subscriber. For example, a user and/or a person to whom the user reports (or is otherwise above the user in an enterprise hierarchy) may be the only person(s) permitted to enter subscription and/or schedule information for the user.

SSM 212 may be configured to receive event information 204, subscription information 220 and schedule information 223, and to generate selected subscriber information 214 based on this received information. Event information 204 may include any of a variety of information relating to the occurrence of an event on communications network 110, including information corresponding to subscription information 218. For example, for each event specified by event information 204, the event information may include any of: an application associated with the event; one or more servers (e.g., computers) associated with the event; one or more server groups (e.g., computer groups) associated with the event; a severity of the event; a description of the event; and a source of the event.

Although FIG. 2 shows event information 204 originating from communications network 110, the invention is not so limited. In some embodiments, the event information 204 may be received from an event database to which the TNA 208 may be directly connected, for example, on a same network device. Such event information may be generated from information received from communications network 110, stored locally and then accessed by SMM 212. Further, one or more other event databases providing event information may reside on communications network 110.

SSM 212 may be configured to compare event information 204 to subscription information 220, for example, in response to receiving event information 204. SSM 212 also may be configured to compare time information to schedule information 223 for one or more users. Based on these one or more comparisons, SSM 212 may select one or more users to whom to send a notification and output selected subscription information 214 to NDM 216. SSM 212 may be part of a notification generator that generates notification information and sends the notification information to NDM 216, for example, as described below in relation to FIGS. 3 and 12. The selected subscriber information may be included in notification information sent to NDM 216.

SSM 212 may be configured to compare one or more pieces of information included in event information 204 for a particular event to a corresponding one or more pieces of information for a given subscriber from subscription information 220. For example, for one or more subscribers, SSM 212 may be configured to compare any of the following pieces of event information for a particular event: an application associated with the event; a server associated with the event; a server group associated with the event; a severity of the event; a description of the event; and a source of the event, to a respective one of any of the following pieces of subscription information of a subscriber: one or more applications for which the subscriber is responsible; one or more servers for which the subscriber is responsible; one or more server groups for which the subscriber is responsible; a severity threshold of an event for which to notify the subscriber; one or more event descriptions for which to notify the subscriber; and one or more event sources for which to notify the subscriber.

SSM 212 may configured to determine that a subscriber is eligible to receive a notification about the event if one or more (e.g., all) of the pieces of subscription information match the corresponding pieces of event information. After or during this determination, SSM 212 may determine a current time, and compare the current time to the schedule information of the subscriber, i.e., the work schedule and any work schedule exception of the subscriber. For example, SSM 212 may be configured to compare, for each eligible subscriber, the determined current time to the work schedule information and the work schedule exception information included within schedule information 223. The current time may be recorded according to time standard such as, for example, Coordinated Universal Time (UTC).

SSM 212 may select the one or more subscribers of the eligible subscribers for whom the current time falls within the subscriber's work schedule and does not satisfy a schedule exception for the user. From these selected subscribers, SSM 212 may generate selected subscriber information 214. It should be appreciated that SSM 212 may first compare the current time to the schedule information 223 to determine eligible subscribers, and then compare the subscription information of the eligible subscribers to the event information. Further, the subscription information 220 and schedule information 223 may be combined, and, to selected subscribers to whom to send a notification, the combined information for each subscriber may be compared to the event information 204 and current time.

NDM 216 may be configured to receive selected subscriber information 214 (e.g., included within one or more notification), generate one or more notifications 206 and send them to the one or more selected subscribers. As is described in more detail below in relation to FIGS. 3 and 12, NDM 216 may be configured to re-format notifications received from SSM 212 (which may be part of a notification generator) into notifications 206 having a suitable format (e.g., e-mail, a telephone or pager signal, an instant messaging (IM) message, etc.) for delivery to one or more subscribers. Each received and generated notification may include any of a variety of information, including any of: subscriber information for the subscriber; subscriber device information (described below) for the subscriber; schedule information for the subscriber; event information; and subscription information relating to the subscriber and event.

In some embodiments of the invention, system 200 may be implement using an existing architecture, such as, for example, an SQL NS architecture available from Microsoft Corporation.

Figure 3:
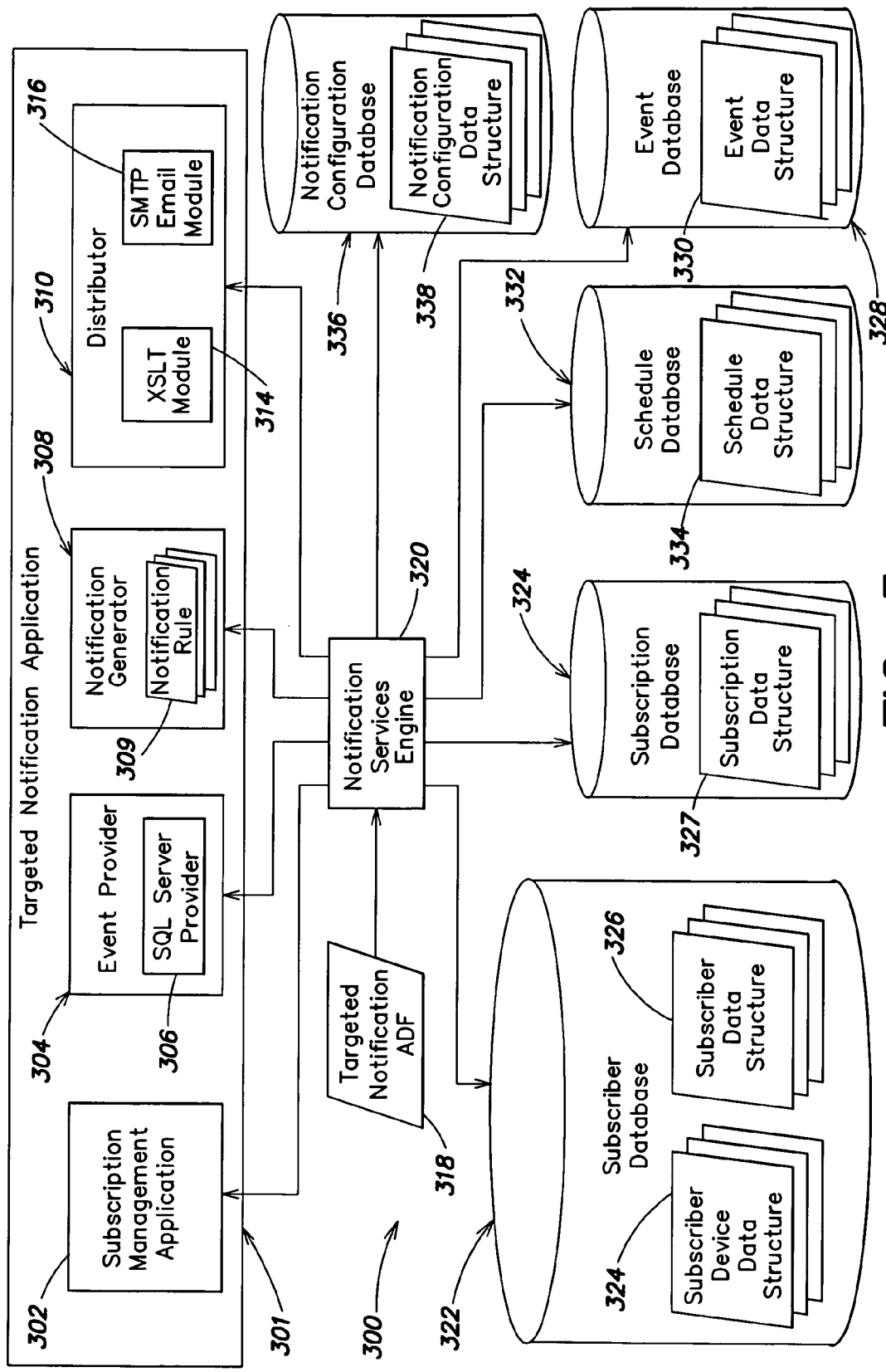
FIG. 3 is a block diagram illustrating an example of a system for configuring a notification architecture to target notifications of events to one or more persons, according to some embodiments of the invention.

FIG. 3 is a block diagram illustrating an example of a system 300 for configuring a notification architecture (e.g., an SQL NS architecture) to target notifications of events to one or more persons. System 300 is merely an illustrative embodiment of a system for configuring a notification architecture to target notifications, and is not intended to limit the scope of the invention. Any of numerous other implementations of such a system, for example, variations of system 300, are possible and are intended to fall within the scope of the invention.

System 300 may include any of: target notification application (TNA) 301; notification services (NS) engine 320; subscriber database 322; subscription database 324; schedule database 332; event database 328; and notification database 336. It should be appreciated that databases 322, 324, 332, 328 and 336 may be integrated as one or more databases.

TNA 301 may include any of: subscription management application (SMA) 302; event provider 304; notification generator 308; and distributor 310. SMA 302 may be configured to collect subscriber, subscription, subscriber device, and schedule information from a user, and pass this information to an NS Application Programming Interface (API) (see FIGS. 12A and 12B). As used herein, an "application programming interface" or "API" is a set of one or more computer-readable instructions that provide access to one or more other sets of computer-readable instructions that define functions, so that such functions can be configured to be executed on a computer in conjunction with an application program. An API may be considered the "glue" between application programs and a particular computer environment or platform (e.g., any of those discussed below) and may enable a programmer to program applications to run on one or more particular computer platforms or in one or more particular computer environments.

The NS API may be configured to transfer the data entered by a user into an appropriate one or more NS databases, such as, for example, any of databases 322, 324, 332 and 334, for example, as described below in relation to FIGS. 12A and 12B.

Event provider 304 may be configured to generate one or more events based on changes to information on a network such as, for example, anywhere on network 110. Event provider 304 may include a SQL server provider 306 configured to collect/receive information, including changes to information, from one or more network devices on a network (e.g., in accordance with an SQL query language) such as, for example, from one or more SQL databases. Event provider 304, including SQL server provider 306, may be configured to generate events (e.g., in event batches as one or more event objects), and store the events in an event database 328, which will be described in more detail below in relation to FIGS. 12A and 12B. Event provider 304 may include other types of event providers.

Notification generator 308 may be configured to generate one or more notifications, for example, by matching event information and/or current time information to subscription information and/or schedule information, respectively. Notification generator 308 may include one or more notification rules 309. Rules 309 may be applied by generator 308 (e.g., an EventRule component of a Generator of an SQL NS architecture) to determine subscriber(s) to whom a notification should be sent. For example, rules 309 may specify an SQL query to be performed on event information to determine matches between event information and subscription and/or matches between current time information and schedule information. Notification generator 308 may be configured to perform the functions of SSM module 212 described above, and will be described in more detail below in relation to FIGS. 12A and 12B.

Distributor 310 may be configured to send notifications to one or more subscribers in accordance with one or more formats, such as, for example, as an e-mail in accordance with the Simple Mail Transport Protocol (SMTP). Distributor 310 may include XSLT CS module 312, XSLT module 314 and SMTP e-mail module 316. XSLT module 314 may be configured to transform XML documents into other XML documents in accordance with Extensible Stylesheet Language Tranformations (XSLT), and module 312 may be configured to transform XML documents into other documents. Thus, module 312 and 314 may be configured to transform notifications from one XML format to another XML format. Distributor 310 may include other modules for converting notifications to one or more other notification formats.

Notification Services Engine (NSE) 320 may configure one or more components of TNA 301 and/or one or more components of databases 322, 324, 328, 332 and 336 based on information (e.g., metadata) included within targeted notification application definition file (ADF) 318. Such configuration may be performed when system 300 is initially installed (e.g., at a client site). The ADF 318 may include any of a variety of information, including any of: one or more data structures for events; information that SMA 302 may receive; the data structure of notification information generated by notification generator 308; one or more notification rules; the entity that will provide events for event provider 304 (e.g., SQL server provider 306); configuration details of distributor 310; and other information. ADF 318 may include information defining a number of schemas, each of which may be used to define one or more data structures of any of databases 322, 324, 328, 332 and 336.

Targeted notification ADF 318 may be configured in accordance with a markup language such as, for example, the extensible markup language (XML). ADF 318 may specify a plurality of schemas (e.g., in accordance with a markup language such as XML), including any of schemas 400, 500, 600, 700, 800, 900, 1000 and 1100 described below in relation to FIGS. 4-11. NSE 320 may be configured to use the schema definitions to define data structures for any of databases 322, 324, 328, 332 and 336. Further NSE may use these definitions to configure any of the components of TNA 301.

ADF 318 may define a subscription schema, from which one or more subscription data structures (e.g., tables) 327 may be configured in subscription database 324. These data structures may make use of existing data structures provided by a notification architecture (e.g., SQL NS) such as, for example, NSAlertSubscriptionSubscriptions. As will be described in more detail below in relation to FIG. 13, subscription information entered by user can be stored as one or more records (e.g., table entries) in accordance with one or more subscription data structures 327.

FIG. 4 illustrates an example of a subscription schema 400 in accordance with some embodiments of the invention, which defines a data structure for storing subscription information for one or more subscribers. Schema 400 may include a plurality of fields, each field having a field name 402 and a field type 404. Entries of schema 400 may include: server identifier field 406 for specifying a server (a computer) for which a subscriber is responsible; event subscription field 408 for specifying an event description for which to notify a subscriber; severity field 410 for specifying a severity threshold of an event for which to notify the subscriber; source field 412 for specifying an event source for which to notify the subscriber; application field 414 for specifying an application (e.g., by indicating a management pack identifier) for which the subscriber is responsible; and server group field 416 for specifying a server group (e.g., a computer group) for which a user is responsible.

FIG. 5 is a diagram illustrating an example of a subscriber work schedule schema 500 in accordance with some embodiments of the invention, which defines a data structure for storing work schedule information for one or more subscribers. FIG. 6 is a diagram illustrating an example of a subscriber work schedule exception schema 600, which defines a data structure for storing work schedule exception information for one or more subscribers. NSE 320 may be configured to use schemas 500 and 600 to configure one or more schedule data structures 334 of schedule database 332, which may be used to store schedule information entered by a user, for example, through SMA 302. For example, NSE 320 may be configured to use ScheduleOverride table available from SQL NS to configure schedule data structure 334.

FIG. 7 is a diagram illustrating an example of an event schema 700 in accordance with some embodiments of the invention. Schema 700 defines a data structure that may be used by event provider 304 to store events in event database 328. NSE 320 may be configured to use schema 700 (received a part of targeted notification ADF 318) to configure an event data structure 330 for storing event information. NSE 320 may be configured to use one or more data structures provided by a notification architecture to configure events data structure 330. For example, NSE 320 may be configured to use NSAlertEventEvents table available from SQL NS.

Schema 700 may include a plurality of fields, each field having a field name 702 and a field type 704. Schema 700 may include any of the following fields: server field 706 for specifying a server (e.g., a computer) associated with an event; description field 708 for specifying a description of an event; severity field 710 for specifying a severity of an event; source field 712 for specifying a source of an event application field 714 for specifying an application (e.g., by indicating a management pack identifier) associated with an event; and a server group field 716 for specifying a server group (e.g., computer group) associated with an event.

FIG. 8 is a diagram illustrating an example of a notification schema 800 according to some embodiments of the invention. Notification schema 800 may define a notification configuration data structure for storing notification information for notifications to be sent to subscribers. NSE 320 may use schema 800 to configure one or more notification configuration data structure 338 in notification configuration database 336. Notification generator 308 may store notification information in notification configuration database 336 in accordance with data structure 338. NSE 320 may be configured to use notification-related tables provided by an NS architecture to configure data structures 338, including NSAlertNotificationNotifications table provided by SQL NS.

Notification schema 800 may include a plurality of fields, each field including a field name 802 and field type 804. Schema 800 may include any of the following fields: server field 806 for specifying a server (e.g., a computer) associated with an event; description field 808 for specifying a description of an event; severity field 810 for specifying a severity of an event; source field 812 for specifying a source of an event; application field 814 for specifying an application (e.g., by indicating a management pack identifier) associated with an event; and a server group field 816 for specifying a server group (e.g., computer group) associated with an event.

FIG. 9 is a diagram illustrating an example of an event chronicle schema 900 in accordance with some embodiments of the invention. Schema 900 may be used to maintain current event information for a notification system, and may be used by NSE 320 to define an event chronicle table to be populated with recent event data. For example, event provider 304 may be configured to generate event records 1230 in batches, based on information 1204. Event provider 304 may timestamp pieces of information 1204, store the time-stamped information (at least temporarily) in event database 328 (e.g., as rows in a table), and generate event records 1230 in the time-stamped information. Event provider 304 may be configured to store a time that a last event batch was generated (the last run time) in a row of a database record generated from the first row of event chronicle schema 900. When generating a next batch of event records 1230, event provider 304 may select all rows of time-stamped information that have a time stamp specifying a time between the last run time and the time at which the batch is currently being generated (the current run time). Event provider may use these selected rows to generate one or more event records 1230.

FIG. 10 is a diagram illustrating an example of a management pack schema 1000 in accordance with some embodiments of the invention. Management pack schema 1000 may be used to configure one or more data structures for storing a definition of a management pack.

FIG. 11 is a diagram illustrating an example of a time zone schema 1100 according to some embodiments of the invention. Schema 1100 may be used by NSE 320 to configure a time zone data structure for storing time zone information. The "Offset" field may be used to specify a time-zone offset between a local time of the device on which the schedule information of a subscriber is stored (e.g., in schedule database 221 or 332) and a standard time such as, for example, UTC time. Schedule database 221 or 332 may reside on a same device as TNA 208 or 301, for example, on a notification server such as notification server 118. The offset information may be used to convert time fields included within schedule information (e.g., a subscriber's work schedule and/or one or more work schedule exceptions) to UTC time. Accordingly, in some embodiments, time information included within event information may be specified in UTC time. In such embodiments, when determining whether to send a notification to one or more subscribers, schedule information may be compared to the determined current time in UTC time.

It should be appreciated that the invention is not limited to schemas 400-1100 illustrated in FIGS. 4-11, and any of numerous other implementations of these schemas, for example, variations of schemas 400-1100 are possible and are intended to fall within the scope of the inventions. Further each of the schemas may include additional rows and/or columns, and the arrangement of the rows and columns may be different than the arrangements shown in FIGS. 4-11.

Figure 12A:
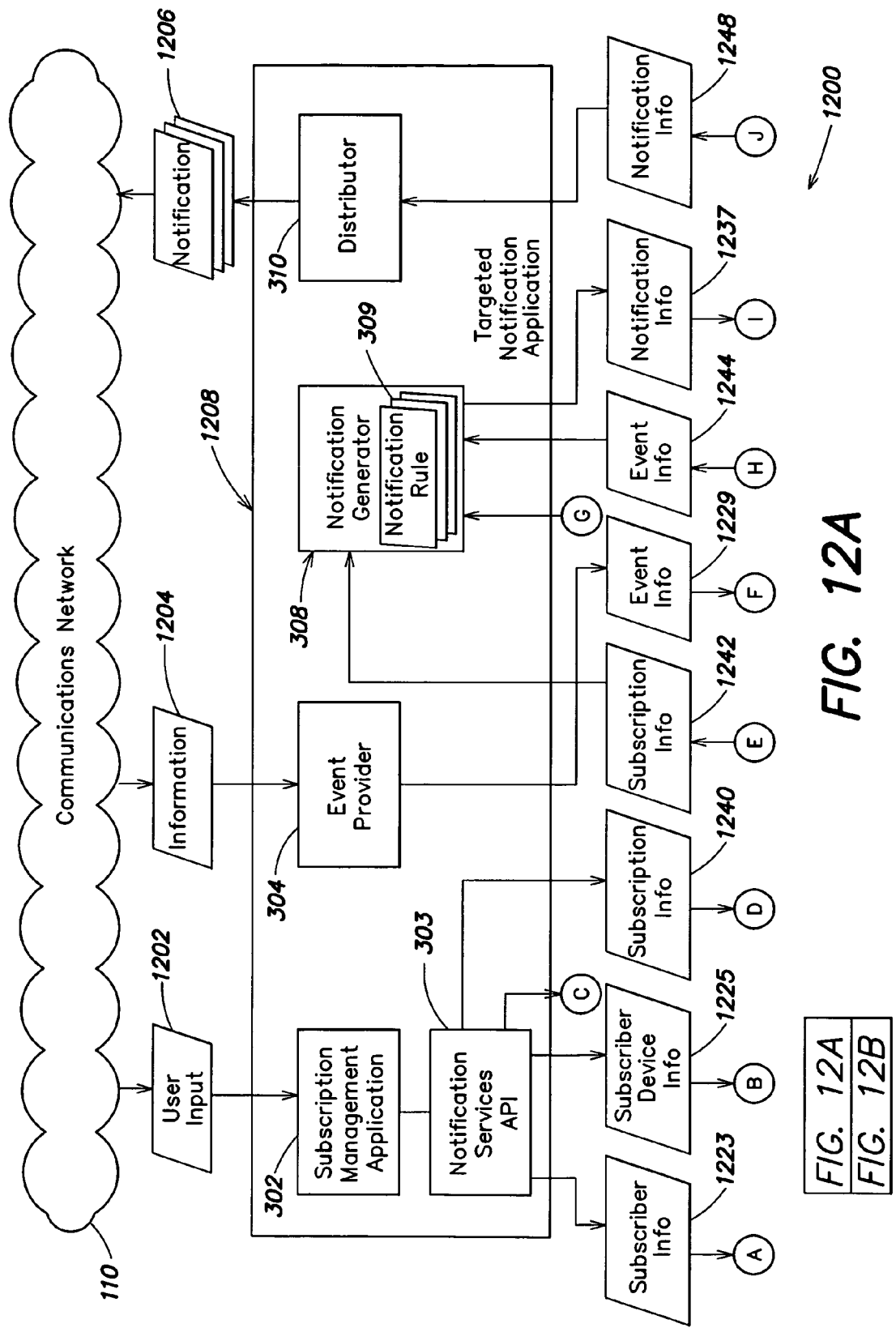
FIGS. 12A and 12B comprise a block diagram illustrating an example of a system for notifying at least one person of an occurrence of an event associated with a network device, according to some embodiments of the invention.
Figure 12B:
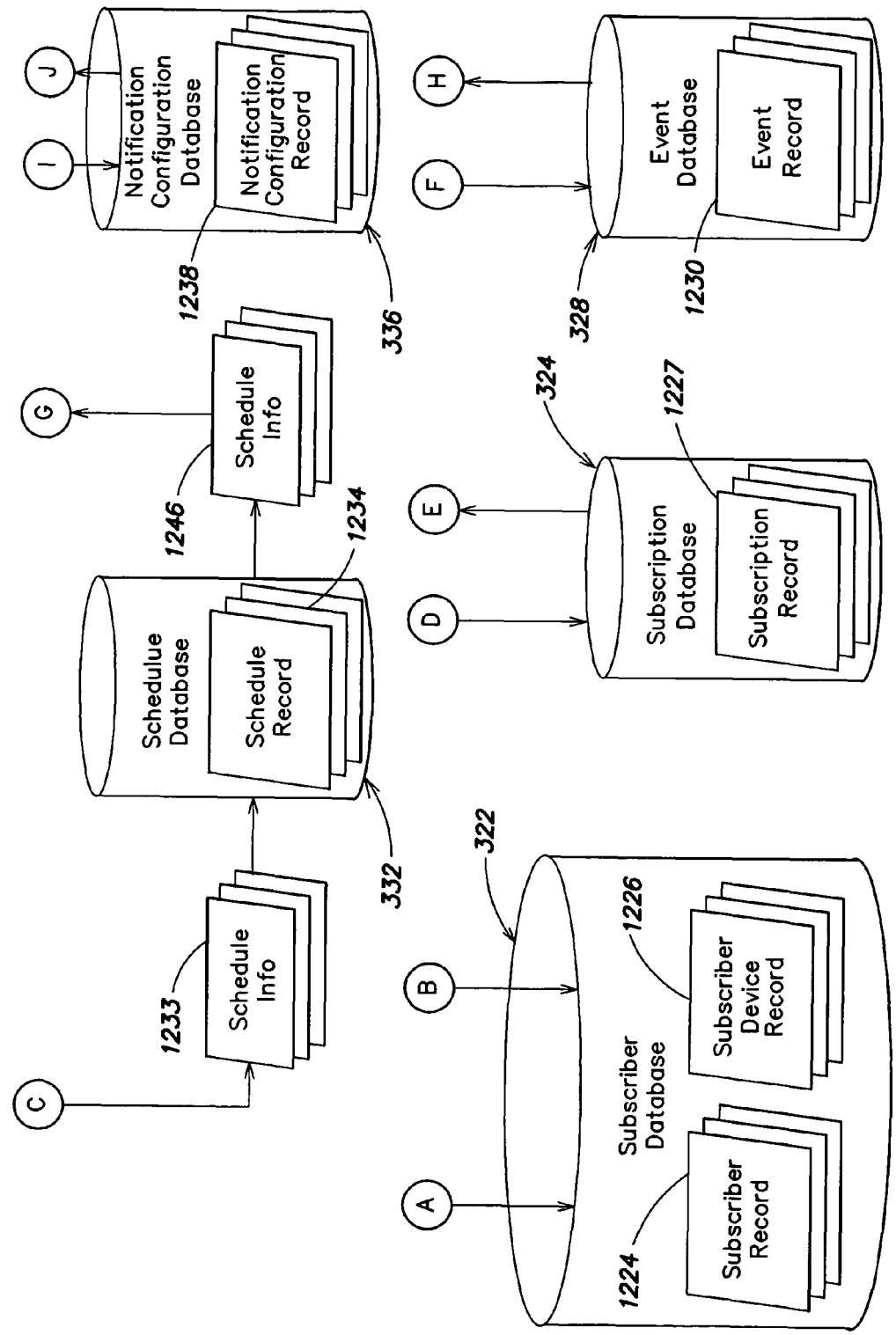

FIGS. 12A and 12B comprise a block diagram illustrating an example of a system 1200 for automatically notifying at least one person of an occurrence of an event associated with a network device, according to some embodiments of the invention. System 1200 is merely an illustrative embodiment of a system for automatically notifying at least one person of an occurrence of an event, and is not intended to limit the scope of the invention. Any of numerous other implementations of such a system, for example, system 200 and variations of system 200 and 1200, are possible and are intended to follow within the scope of the invention. System 1200 may have been configured by system 300 as described above in relation to FIG. 3.

As described above, SMA 302 may be configured to enable on or more users to provide user input 1202 for one ore more subscribers. SMA 302 may pass this information to notification API 303, which may generate any of: subscriber information 1223, subscriber device information 1225, subscription information 1240 and schedule information 1233, and store them as one or more subscriber records 1224, subscriber device records 1226, subscription records 1240 and schedule records 1234, respectively. Subscriber information 1223, schedule information 1233 and subscription information 1240 may include any of the information described above in relation to FIGS. 2 and 3. Subscriber device information 1225 may include information relating to the user device on which a subscriber is to receive notifications. Through SMA 302, a subscriber may specify one or more devices, where each device may have a unique name. Subscriber device information 1225 also may include, for each specified device, a type of the device, such as, for example, a device that supports receiving e-mail using SMTP. For this type of device, subscriber device information may include a valid e-mail address. Subscriber device information 1225 also may include an indication that for a particular device, a subscriber wishes to receive a limited-text notification. A limited-text notification may include an abbreviated amount of notification information, as opposed to all of the notification information typically included in a notification (e.g., as specified by one or more notification configuration structures 338).

In some embodiments, NS API 303 may be configured to use abstractions (e.g., classes or other type definitions) available from a notification architecture to enter, update and/or delete subscriber devices from subscriber database 322. For example, SMA 302 may be configured to utilize SubscriberDevice and SubscriberDeviceEnumeration classes available from an SQL NS architecture.

For schedule information, SMA 302 may be configured (e.g., by NSE 320) to utilize ActiveX Data Objects (ADO) of the .NET technology (i.e., ADO.NET) to exchange information with schedule database 332.

Figure 13:
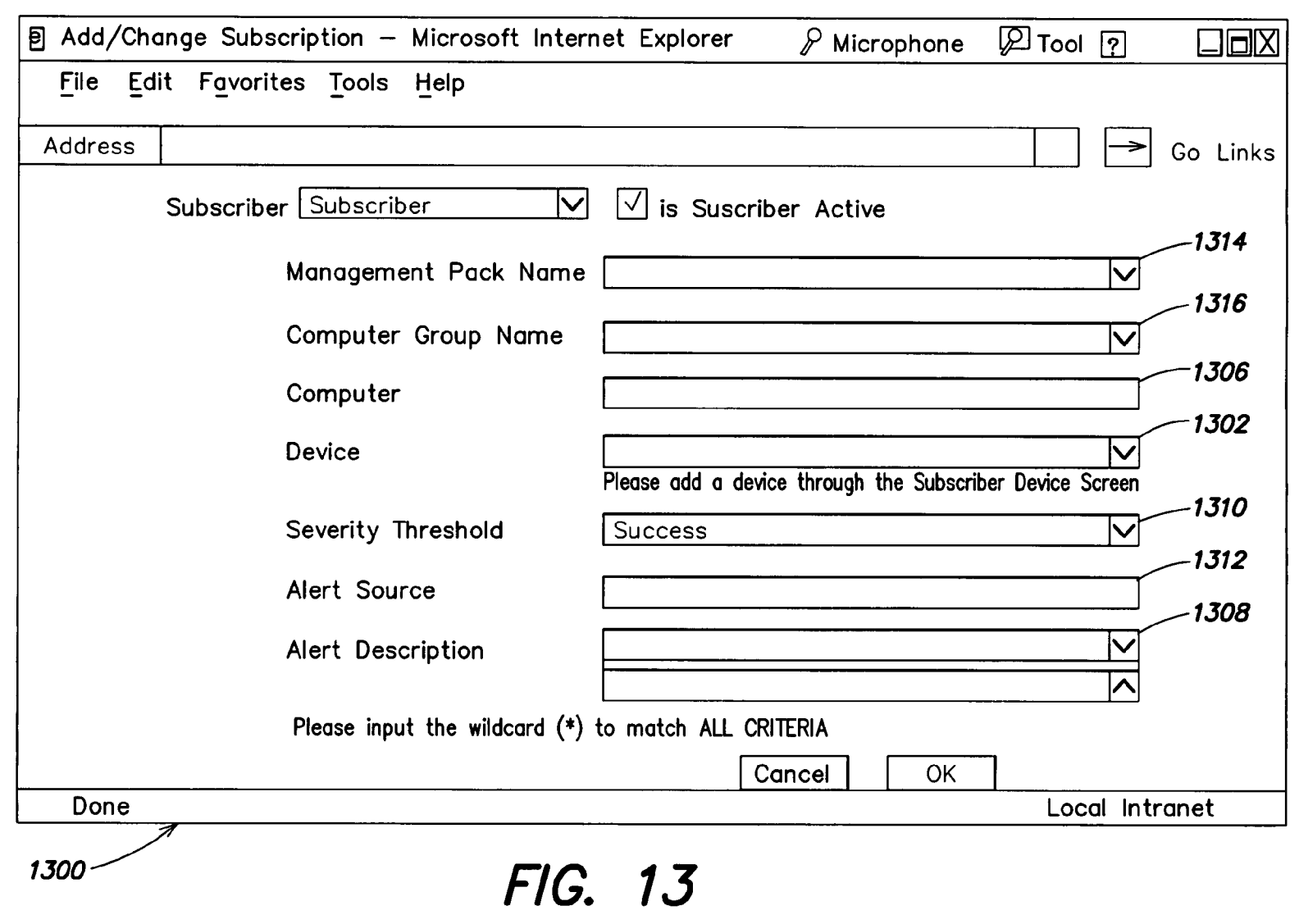

Digressing briefly from FIGS. 12A and 12B, FIG. 13 is a screen shot illustrating an example of a user interface display 1300 for adding and/or changing subscription information for a user. Display 1300 is merely an illustrative embodiment of a display enabling a user to enter subscription information, and is not intended to limit the scope of the invention. Any of numerous other implementations of such a display, for example, variations of display 1300, are possible and are intended to fall within the scope of the invention. For example, display 1300 may be configured to allow display of more or less information than that shown in FIG. 13. Further, the size, location and type of each element in the display and the arrangement of elements in the display can be different than as shown in FIG. 13.

Display 1300 may be configured to enable a user to enter any of a variety of subscriber and subscription information, including any of the subscription information described above. Display 1300 may include any of: application field 1314; server group field 1316; server field 1306; device field 1302; severity threshold field 1310; notification source field 1312; notification description field 1308; and other types of fields. Application field 1314 may be a combobox enabling a user to select one or more applications for which the user is to be responsible. For example, field 1314 may enable a user to select one more management packs, each management corresponding a particular application. Field 1314 may be any other plurality of other types of fields and may enable an user to enter one or more applications in addition or as an alternative to selecting one or more applications. In some embodiments, field 1314 may enable a user to enter a wildcard symbol indicating that the subscriber is to be responsible for all eligible applications.

Server group field 1316 may be a combobox enabling a user to select one or more servers (e.g., computers) from an existing list of servers, for which the subscribers is to be responsible. Field 1316 may be any other variety of other types of fields and may enable a user to enter one or more server groups as an alternative or in addition to selecting one or more server groups. Field 1316 may be configured to enable a user to indicate that a subscriber is to be responsible for all eligible servers. For example, field 1316 may enable a user to enter a wildcard symbol such as an asterisk.

Server field 1306 may be a combobox or other type of field enabling a user to enter and/or select one or more servers (e.g., computers) for which a subscriber is to be responsible. Field 1306 may enable a user to indicate that a subscriber is to be responsible for all available computers, for example, by enabling a user to enter a wildcard symbol such as an asterisk.

Device field 1302 may be a combobox or another type of field that enables a user to enter and/or select one or more devices on which the user is to receive notifications. Severity threshold field 1310 may be a combobox or another type of field enabling a user to enter and/or select a severity threshold of an invent for which notify a subscriber. Field 1310 may be configured to enable a user to indicate that a subscriber is to be notified of an event irrespective of its threshold, for example, by enabling a user to enter a wildcard symbol such as an asterisk.

Alert field 1312 may be a combobox or another type of field that enables a user to enter and/or select one or more event sources for which to notify a subscriber. Field 1312 may be a configured to enable a user to specify that a subscriber is to be notified of events irrespective of the source of an event, for example, by enabling a user to enter a wildcard symbol such as an asterisk.

Event description field 1308 may be a text box or another type of field that enables a user to select and/or enter one or more event descriptions for which to notify a subscriber. Field 1308 may be configured to enable a user to indicate that a subscriber is to be notified of an event irrespective of its description, for example, by enabling a user to specify a wildcard symbol such as an asterisk.

One or more user interface displays similar to display 1300 may be provided to enter subscriber information, subscriber device information and/or schedule information.

Returning to FIGS. 12A and 12B, event provider 304 may be configured to receive information 1204 (e.g., changes to one or more pieces of information on network 110) and generate event information 1229 to be stored in event database 328 as one or more event records 1230. The event provider 304 may be configured to generate event information 1229, to be stored as one or more event records 1230, in accordance with one or more events data structures 330. Event provider 304 may be configured to monitor (e.g., periodically) one or more network devices on network 110 to determine if any information has changed since it was last checked.

Notification generator 308 may be configured to monitor event database 328 (e.g., periodically) to determine if there are any new event records 1230 indicating the occurrence of a new event. If it is determined that there are new events (e.g., since the last time it was checked), notification generator 308 may retrieve event information 1244 from event database 328 and compare event information 1244 to subscription information 1342 for one or more subscribers, for example, as described above in relation to FIG. 2. Notification generator 308 also may determine a current time and compare the current time to schedule information 1246 for one or more subscribers. Based on the results of one or both of these comparison, notification generator 308 may generate notification information 1237 specifying one or more notifications to be sent to one or more subscribers. This notification information 1237 may be stored as one or more notification records 1238 in accordance with notification configuration data structures 338 described above.

Distributor 310 may be configured to monitor notification database 336 (e.g., periodically) to determine if there are any new notification records 1238. If it is determined that there are new notification records, distributor 310 may retrieve notification information 1248 from these notification records and transmit one or more notifications 1206 to the one or more subscribers indicated in the notification information. As discussed above, distributor 310 may configure each of the notifications 1206 in accordance with one or more formats and may be configured to convert the notification information 1248 to the one or more formats.

In embodiments in which system 1200 is implemented using an SQL NS architecture and information 1204 is received from a OnePoint database or one or more other MOM databases available from Microsoft Corporation, system 1200 may include a Data Transformation Service (DTS) module (not shown) configured to synchronize information 1204 with information stored in one or more of the databases shown in FIGS. 12A and 12B.

Each of systems 100, 200, 300 and 1200, and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. For example, SMM 210 and SMA 302 may be configured using any of the plurality of technologies such as, for example, Microsoft.NET technology, which may involve using Active Server Pages (ASP) available from .NET (ASP.NET) and/or C#. One or more of the components of systems 100, 200, 300 and 1200 may reside on a single device (e.g., a computer), or one or more components may reside on separate, discrete devices. Further, each component may be distributed across multiple devices, and one or more of the devices may be interconnected.

Further, on each of the one or more devices that include one or more components of systems 100, 200, 300 and 1200, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. Each of systems 100, 200, 300 and 1200, and components thereof, may be implemented using a computer system such as that described below in relation to FIGS. 15 and 16.

Figure 14:
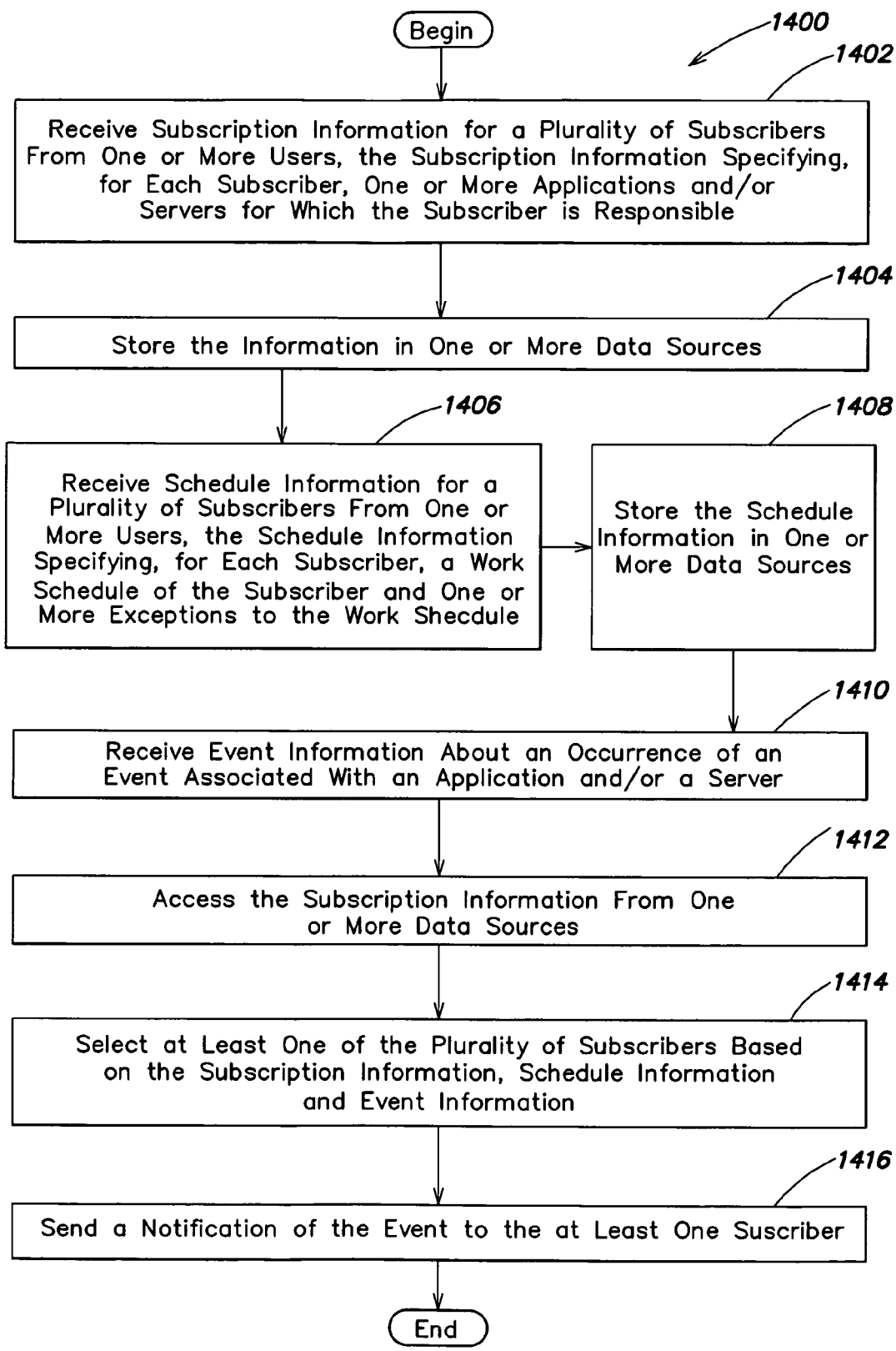
FIG. 14 is a flowchart illustrating an example of a method of automatically notifying at least one person of an occurrence of an event associated with a network device, in accordance with some embodiments of the invention.

FIG. 14 is a flowchart illustrating an example of a method 1400 of notifying at least one person of an occurrence of an event associated with a network device, in accordance with some embodiments of the invention. Method 1400 is merely an illustrative embodiment of a method of notifying at least one person of an occurrence of an event, and is not intended to limit the scope of the invention. Any of numerous other implementations of such a method, for example, variations of method 1400, are possible and are intended to fall within the scope of the invention.

In Act 1402, subscription information for a plurality of subscribers may be received from one or more users. Subscription information may specify, for each subscriber, one or more applications and/or servers for which the subscriber is responsible and/or any of the subscription information described above. Act 1402 may be performed in accordance with any of the embodiments of the invention described above. For example, the information may be received using any of SMM 210, SMA 302 and/or user interface display 1300.

In Act 1404, the subscription information may be stored in one or more databases such as, for example, any of databases 120, 222 and 324 described above in relation to FIGS. 1, 2, 3 and 12.

In Act 1406, schedule information may be received for a plurality of subscribers from one or more users. The schedule information may specify, for each subscriber, a work schedule of the subscriber, one or more exceptions to the work schedule and other information. Act 1406 may be performed according to any of the embodiments of the invention described above. For example, schedule information may be received using SMM 210 and/or SMA 302.

In Act 1408, the schedule information may be stored in one or more databases such as, for example, any of notification database 120, schedule database 221 and/or schedule database 332 described above in relation to FIGS. 1, 2, 3 and 12.

In Act 1410, event information about an occurrence of an event may be received, where such an event may be associated with an application and/or a server such as, for example, any of servers 104, 114 and 122 described above in relation to FIG. 1. This information may be received in accordance with any of the embodiments described above. For example, this information may be received from a remote source (e.g., on network 110) by SSM 212 of system 200 and/or may be received from an event database (e.g., event database 328) by a notification generator (e.g., notification generator 308). In some embodiments, Act 1410 includes an event provider receiving information, and storing event information generated from this information in an event database. The stored event information may be extracted by a notification generator, for example, as described above in relation to FIGS. 12A and 12B.

In Act 1412, subscription information may be accessed from one or more data sources, for example, in response to receiving the event information. Further, schedule information may be accessed from one or more data sources, for example, in response to Act 1410. The one or more data sources from which the subscription and/or the schedule information may be accessed may be any of a plurality of types of data sources, for example, notification database 120, subscription database 222, subscription database 324, schedule database 221 and/or schedule database 332.

In Act 1414, at least one of the plurality of subscribers for which information was accessed may be selected based on the accessed subscription information, schedule information and/or event information. Other information may be used to select subscribers as well. As described above in relation to FIGS. 2, 3, 12A and 12B, the event information may be compared to subscription information and/or scheduling information. Based on the selection, notification information may be generated that includes an indication of the one or more selected subscribers, along with other information regarding the notification such as, for example, event information and subscriber device information. Act 1414 or parts thereof may be performed by one or more of the components described above such as, for example, SSM 212 and/or notification generator 308.

In Act 1416, a notification of the event may be sent to the at least one subscriber, for example, as described above in relation to notification distribution module 216 and/or distributor 310.

Method 1400 may include additional acts. Further, the order of the act performed as part of method 1400 is not limited to the order illustrated in FIG. 14, as the acts may be performed in other orders and/or one or more of the acts may be performed in series or in parallel (at least partially). For example, Acts 1406 and 1408 may be performed before and/or in parallel to Acts 1402 and 1404.

Method 1400, acts thereof and various embodiments and variations of this method and these acts, individually or in combination, may be defined by computer-readable signals tangibly embodied on or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., method 1400 or any acts thereof), and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 200, 300, 1200, 1500, and 1600 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Figure 15:
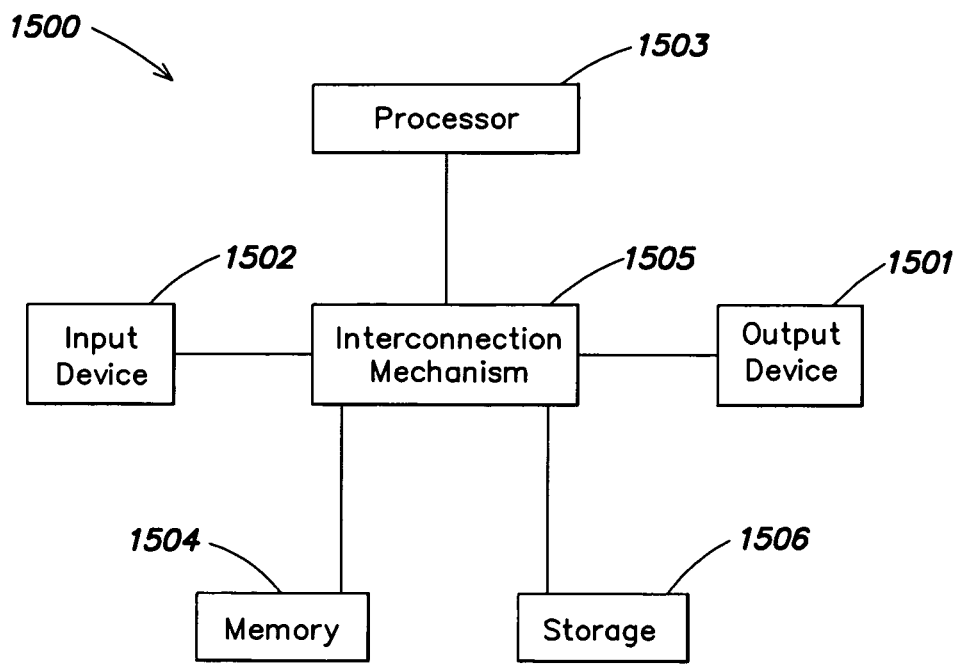
FIG. 15 is a block diagram illustrating an example of a computer system on which some embodiments of the invention may be implemented.
Figure 16:
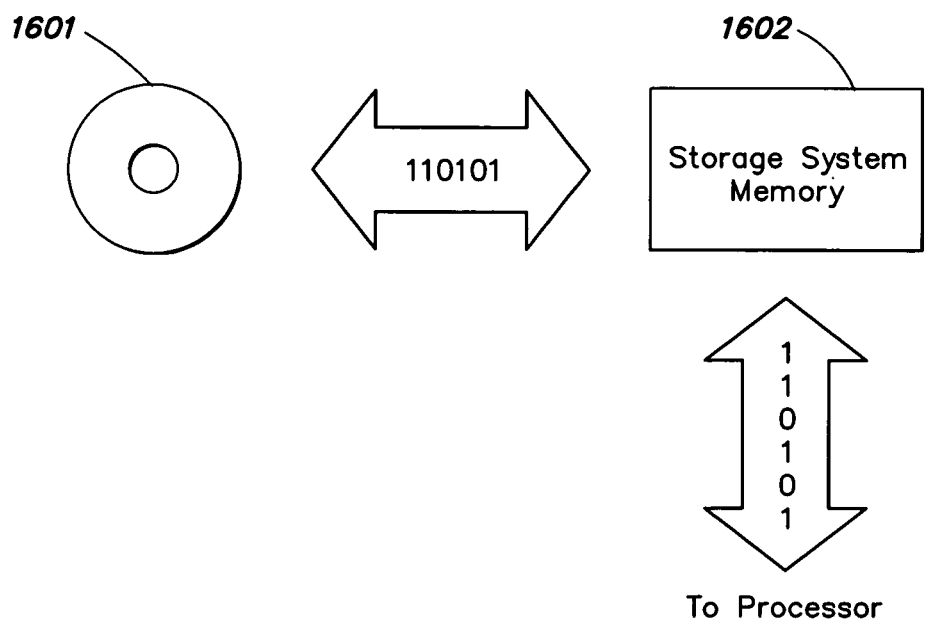
FIG. 16 is a block diagram illustrating an example of a storage system that may be used as part of the computer system to implement some embodiments of the invention.

It should be appreciated that any single component or collection of multiple components of a computer system, for example, the computer system described in relation to FIGS. 15-16, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system, according to some embodiments of the invention, may be configured to perform any of the functions described above. It should be appreciated that the system may perform other functions and the invention is not limited to having any particular function or set of functions.

For example, various aspects of the invention may be implemented as specialized software executing in a general-purpose computer system 1500 such as that shown in FIG. 15. The computer system 1500 may include a processor 1503 connected to one or more memory devices 1504, such as a disk drive, memory, or other device for storing data. Memory 1504 is typically used for storing programs and data during operation of the computer system 1500. Components of computer system 1500 may be coupled by an interconnection mechanism 1505, which may include one or more busses (e.g., between components that are integrated within a same machine) and/or a network (e.g., between components that reside on separate discrete machines). The interconnection mechanism 1505 enables communications (e.g., data, instructions) to be exchanged between system components of system 1500. Computer system 1500 also includes one or more input devices 1502, for example, a keyboard, mouse, trackball, microphone, or touch screen, and one or more output devices 1501, for example, a printing device, display screen, or speaker. In addition, computer system 1500 may contain one or more interfaces (not shown) that connect computer system 1500 to a communication network (in addition or as an alternative to the interconnection mechanism 1505).

The storage system 1506, shown in greater detail in FIG. 16, typically includes a computer readable and writeable nonvolatile recording medium 1601 in which signals are stored that define a program to be executed by the processor or information stored on or in the medium 1601 to be processed by the program. The medium may, for example, be a disk or flash memory. Typically, in operation, the processor causes data to be read from the nonvolatile recording medium 1601 into another memory 1602 that allows for faster access to the information by the processor than does the medium 1601. This memory 1602 is typically a volatile, random access memory such as a dynamic random access memory (DRAM) or static memory (SRAM). It may be located in storage system 1506, as shown, or in memory system 1504, not shown. The processor 1503 generally manipulates the data within the integrated circuit memory 1504, 1602 and then copies the data to the medium 1601 after processing is completed. A variety of mechanisms are known for managing data movement between the medium 1601 and the integrated circuit memory element 1504, 1602, and the invention is not limited thereto. The invention is not limited to a particular memory system 1504 or storage system 1506.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1500 is shown by way of example as one type of computer system upon which various aspects of the invention may be practiced, it should be appreciated that aspects of the invention are not limited to being implemented on the computer system as shown in FIG. 15. Various aspects of the invention may be practiced on one or more computers having a different architecture or components that that shown in FIG. 15.

Computer system 1500 may be a general-purpose computer system that is programmable using a high-level computer programming language. Computer system 1500 may be also implemented using specially programmed, special purpose hardware. In computer system 1500, processor 1503 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Similarly, in the written description above, use of an ordinal term to modify an element does not by itself connote any priority, precedence, or order of the modified element over another element or the temporal order in which acts of a method are performed. Ordinal terms are used merely as labels to distinguish one element from another, unless otherwise indicated.

What is claimed is:

1. A method of notifying at least one person of an occurrence of an event associated with an application and/or a server, comprising computer-implemented acts of:

receiving, by a notification server, event information specifying the event, the event information including an indication of the application and/or an indication of the server, a server group to which the server belongs, a severity of the notification, a description of the notification, and a source of the event;

accessing, by the notification server, subscription information from one or more data sources that store information about a plurality of subscribers that have subscribed to receive notification of certain events, wherein, for each subscriber, the subscription information specifies one or more applications and/or servers for which the subscriber is responsible, and includes one or more server groups for which the subscriber is responsible, a threshold level of severity of an event for which to notify the subscriber, one or more event descriptions for which to notify the subscriber, and one or more event sources for which to notify the subscriber;

accessing, by the notification server, schedule information for one or more of the plurality of the subscribers, wherein the schedule information includes, for each of the one or more subscribers, a work schedule of the subscriber and one or more work schedule exceptions for the subscriber;

selecting, by the notification server, at least one of the plurality of subscribers by comparing, in a first comparison, the subscription information to corresponding event information and comparing, in a second comparison, the work schedule and the one or more work schedule exceptions of the plurality of subscribers to a current time and selecting a subscriber based on results of the first and second comparisons; and sending, from the notification server, a notification of the event to the selected subscriber.

2. The method of claim 1, further comprising an act of:

providing a user interface enabling a user to enter subscription information for one or more subscribers into the one or more data sources.

3. A system for notifying at least one person of an occurrence of an event associated with an application and/or a server, the system comprising a processor and memory for storing modules, the modules including:

a subscriber selection module to select at least one subscriber from a plurality of subscribers that have subscribed to receive notifications of certain events, the module operative to receive event information specifying the event, the event information including an indication of the application and/or an indication of the server, a server group to which the server belongs, a severity of the notification, a description of the notification, and a source of the event, to access subscription information from one or more data sources that store information about the plurality of subscribers, wherein, for each subscriber, the subscription information specifies one or more applications and/or servers for which the subscriber is responsible, and includes one or more server groups for which the subscriber is responsible, a threshold level of severity of an event for which to notify the subscriber, one or more event descriptions for which to notify the subscriber, and one or more event sources for which to notify the subscriber, to access schedule information for one or more of the plurality of the subscribers, wherein the schedule information includes, for each of the one or more subscribers, a work schedule of the subscriber and one or more work schedule exceptions for the subscriber, and to select at least one of the plurality of subscribers by comparing, in a first comparison, the subscription information to corresponding event information and comparing, in a second comparison, the work schedule and the one or more work schedule exceptions of the plurality of subscribers to a current time and selecting a subscriber based on results of the first and second comparisons; and a notification distribution module to send a notification of the event to the selected subscriber.

4. The system of claim 3, further comprising:

a subscription management module that provides a user interface enabling a user to enter subscription information for one or more subscribers into the one or more data sources.

5. A non-transitory computer-readable storage medium encoded with computer-executable instructions that, as a result of being executed by a computer, control the computer to perform a process of notifying at least one person of an occurrence of an event associated with an application and/or a server, the process comprising computer-implemented acts of:

receiving event information specifying the event, the event information including an indication of the application and/or an indication of the server, a server group to which the server belongs, a severity of the notification, a description of the notification, and a source of the event;

accessing subscription information from one or more data sources that store information about a plurality of subscribers that have subscribed to receive notification of certain events, wherein, for each subscriber, the subscription information specifies one or more applications and/or servers for which the subscriber is responsible, and includes one or more server groups for which the subscriber is responsible, a threshold level of severity of an event for which to notify the subscriber, one or more event descriptions for which to notify the subscriber, and one or more event sources for which to notify the subscriber;

accessing schedule information for one or more of the plurality of the subscribers, wherein the schedule information includes, for each of the one or more subscribers, a work schedule of the subscriber and one or more work schedule exceptions for the subscriber;

selecting at least one of the plurality of subscribers by comparing, in a first comparison, the subscription information to corresponding event information and comparing, in a second comparison, the work schedule and the one or more work schedule exceptions of the plurality of subscribers to a current time and selecting a subscriber based on results of the first and second comparisons; and sending a notification of the event to the selected subscriber.

6. The computer-readable storage medium of claim 5, wherein the process further comprises an act of:

providing a user interface enabling a user to enter subscription information for one or more subscribers into the one or more data sources.

* * * * *